Jan. 31, 1950 W. H. BLISS 2,495,805

TONE KEYER CONTROL CIRCUIT

Filed Dec. 14, 1945 3 Sheets-Sheet 1

INVENTOR
WARREN H. BLISS
BY H. S. Grover
ATTORNEY

Jan. 31, 1950 W. H. BLISS 2,495,805

TONE KEYER CONTROL CIRCUIT

Filed Dec. 14, 1945 3 Sheets-Sheet 2

INVENTOR
WARREN H. BLISS
BY H. S. Grover
ATTORNEY

Jan. 31, 1950 W. H. BLISS 2,495,805

TONE KEYER CONTROL CIRCUIT

Filed Dec. 14, 1945 3 Sheets-Sheet 3

INVENTOR
WARREN H. BLISS
BY H. S. Grover
ATTORNEY

Patented Jan. 31, 1950

2,495,805

UNITED STATES PATENT OFFICE 2,495,805

TONE KEYER CONTROL CIRCUIT

Warren H. Bliss, Riverhead, N. Y., assignor to Radio Corporation of America, a corporation of Delaware Application December 14, 1945, Serial No. 635,086

11 Claims. (Cl. 178—66)

Figures 1, 1A:
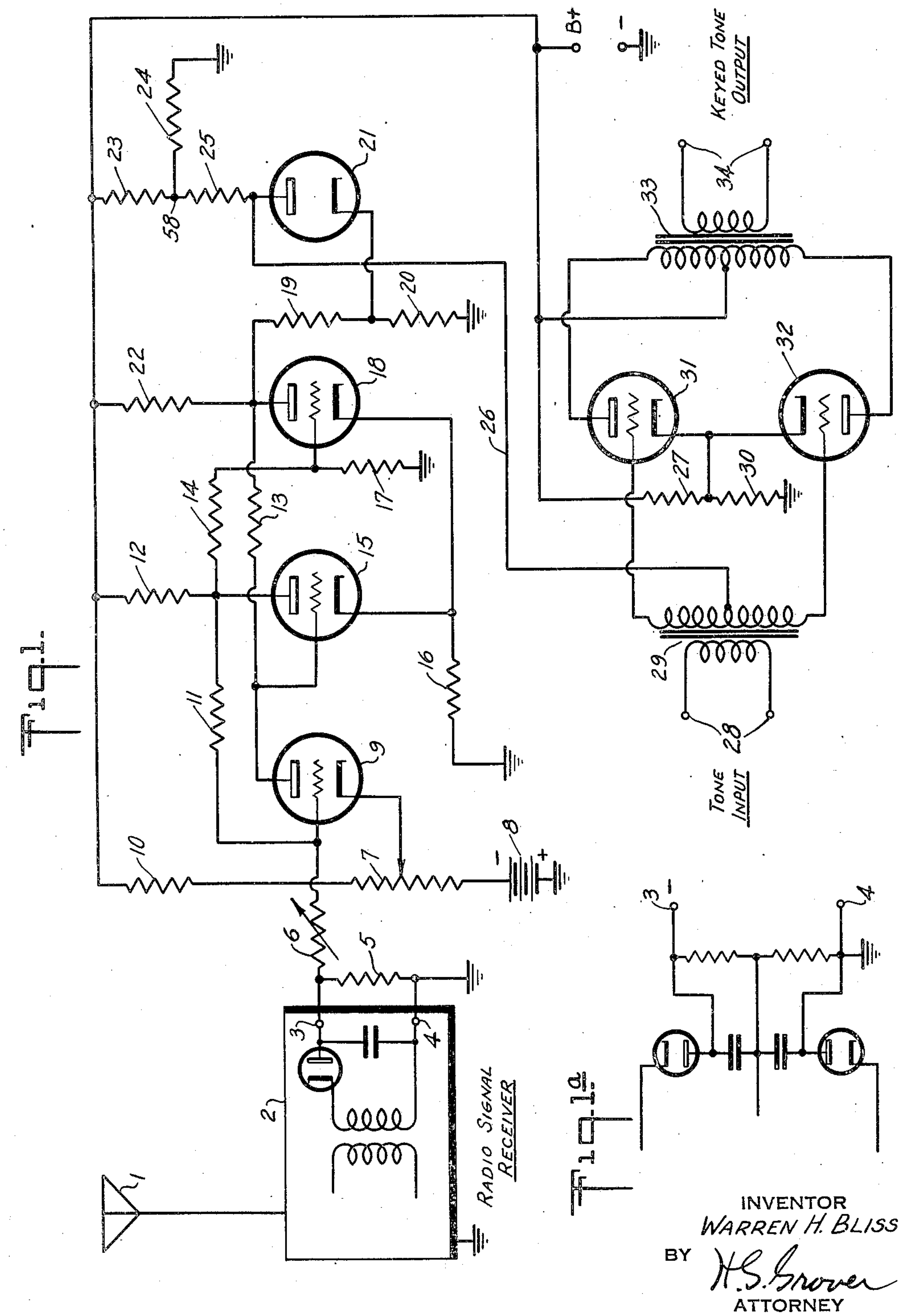

This application relates to tone keyers for telegraphy systems and discloses an improved means for converting the output signal from a radio telegraph receiver into keyed tone form for transmission to a radio terminal for recording or for other utilization.

The tone keyer of my present invention is for use with receivers of telegraphy signals of the off-on type or of the frequency shift type or similar signals. In systems as involved here the receiver has an output in the form of voltage which rises and falls with respect to a base value in accordance with the keying. In many embodiments the output voltage is derived from a diode rectifier and varies in a negative direction in the presence of marking condition in the received wave and back toward zero when the mark condition is changed to space. Moreover, in these known systems this varying voltage with a direct current component is used to operate a triggering or locking circuit which in turn causes definite on and off keying of a tone stage, thereby supplying keyed tone to the radio terminal to operate a printer or for other use.

The diode rectifier pulsating voltage output usually is accompanied by components representing noise on the received telegraphy signal or set up in the system, and in many of these known receivers and recording means the noise components at the rectifier output in the absence of marking currents in the receiver are sufficient to operate the locking or triggering circuit, thereby sending out keyed tone. Moreover, the noise components on the rectified output in the presence of signals are often sufficient to operate the triggering or locking circuit to thereby turn off the tone prematurely. The general object of the present invention is provision of a tone keyer free of the defects mentioned above. This object is accomplished by providing means in the triggering or locking circuit and the control apparatus therefor for holding back or preventing the noise components riding on the marking voltage from turning off or tripping the locking circuits from the positions from which they were tripped by reception of the marking voltage.

A more specific object of my invention is an improved triggering or locking circuit and a control apparatus therefor wherein means is provided for adjusting the exact point at which triggering action takes place on the appearance of marking voltage in the receiver output. This permits location of the threshold point at which marking voltage takes effect to be adjusted above the output noise level in the presence of marking. In my improved system means is also provided for holding back the tripping action when the receiver output marking voltage falls off due to noise component thereon until a lower value of input signal is attained. Then the tone is turned off at a signal value much lower than the signal value at which the tone was turned on. As a result of this improved hold-back function more noise and interference may be tolerated on the received signal. Viewed from another aspect, a lower signal-to-tone ratio may be utilized for printer or other recording operations by use of my invention.

In describing my invention in detail reference will be made to the attached drawings wherein Figs. 1 and 2 each illustrate an embodiment of my improved tone keyer. Fig. 1*a* shows a modified detector circuit to be used at the receiver output in Figs. 1 and 2 to supply the control potentials; while Figs. 3*a*, 3*b*, 3*c*, 3*d*, 3*e* and 3*f* are oscillation or pulse voltage diagrams used to illustrate the operation of my system.

Referring to Fig. 1, elements 1 and 2 indicate a conventional antenna and radio receiver system having a detector with diode output at terminal 3 which is negative. If frequency shift signalling is being carried out the diode arrangement and connections may be as indicated in Fig. 1*a*. For on-off carrier frequency telegraphy the diode connections may be as shown in Fig. 1. The vacuum tube triode 9 has its control grid connected over resistor 5 to terminal 3 by a variable resistance 6 and to the anode of triode 15 through resistor 11. The resistor 5 may be the receiver diode load resistance or connected therewith. A resistor 10 and a potentiometer 7 associated with the positive terminal of a direct current plate supply source and a battery 8 provides a voltage divider and voltage adjusting means for varying the potential at the cathode of the triode 9.

The triodes 15 and 18 are connected in an Eccles-Jordan locking circuit with anode resistors 12 and 22 connecting the anodes to the direct current source and with resistors 13 and 14 cross-coupling the control grids of the tubes. The control grid of triode 15 is also connected to the anode of tube 9 while tube 18 has a grid resistor 17; and the cathodes of both tubes 15 and 18 are connected to ground by a common cathode resistor 16. The tubes 15 and 18 as connected provide an Eccles-Jordan locking circuit broadly similar to that disclosed in Finch U. S. Patent #1,844,950. The arrangement is such that when current is started or caused to flow in tube 15 the grid of tube 18 becomes less positive by virtue of its connection through resistance 14 to the anode of tube 15 and current is cut off in tube 18. When current is caused to decrease in tube 15 by converse action current is cut off in tube 15 and tube 18 becomes fully conductive.

Resistors 19 and 20 comprise a potential divider across the anode and cathode impedance of the locking tube stage 18 and are used to feed potential variations on the anode of this tube representing its output to the cathode of the diode tube 21. Resistors 23 and 24 form a second potential divider across the main direct current source for supplying a positive voltage of suitable value at the point 58, and through series resistor 25 to the anode of diode 21.

The tubes 31 and 32 have their control grids coupled differentially by a transformer 29 to contacts 28 to which alternating current of tone frequency may be applied. The anodes of the tone amplifier tubes 31 and 32 are coupled to the primary winding of a transformer 33, the secondary winding of which supplies the keyed tone output at terminals 34. Fixed bias is provided for the control grids of tubes 31 and 32 by the potential divider comprising resistors 27 and 30. Note that the cathodes are positive with respect to ground. Lead 26 from the anode of the diode 21 supplies a signal voltage from the anode of the diode 21 in like phase to the control grids of the tubes 31 and 32 to make the same conductive or non-conductive, depending on whether or not the locking circuit output represents mark or space.

Figures 3A, 3B, 3C, 3D, 3E, 3F:
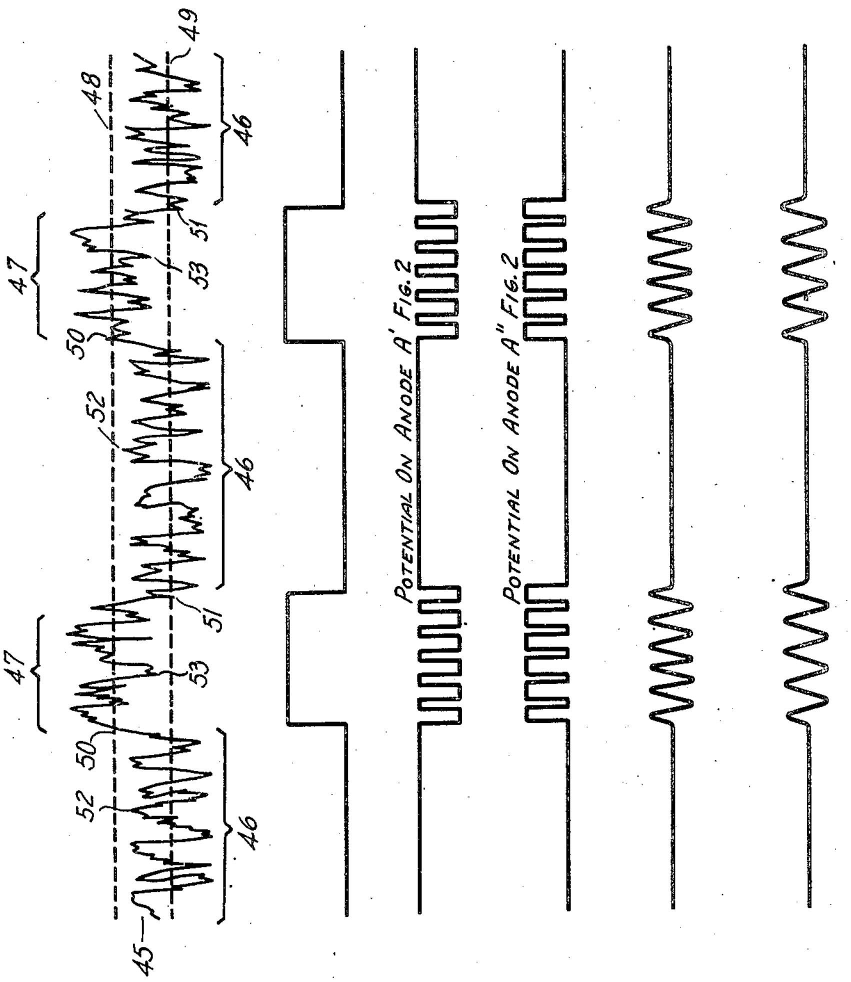

In operation the output of the receiver diode, that is, the input at points 3 and 4 may comprise alternating voltages of the form shown in Fig. 3*a* when the signal-to-noise ratio is poor. It is desired to obtain the keyed tone wave shown by Fig. 3*f*. Portions of the line 45 of Fig. 3*a* designated at 46 indicate the no-signal on, or the noise condition, while the portions at 47 designate the signal-on or signal-and-noise condition.

The output at terminal 3 of receiver 2 is derived from the anode of the diode and is negative. This negative potential is supplied to resistor 5 which may be the receiver diode load and by resistor 6 to the grid of the tube 9 so that this tube 9 is only moderately biased in the negative direction by the noise 46 during the no-signal condition. This moderately negative bias allows triode 9 to be in a state of conduction so that the potential on the grid of tube 15 connected to the anode of tube 9 is held at a relatively low negative potential. This cuts off the tube 15 so that its anode potential is relatively high and this relatively high anode potential is supplied to the grid of tube 18. Hence, tube 18 of the locking circuit is on or conducting when tube 15 of the locking circuit is off or non-conducting.

When the signal comes on, the output of the diode of the receiver will swing more negative and will be as represented at 47 in Fig. 3*a*. This condition will exist at the terminals 3 and 4 and across resistance 5 to swing the grid of tube 9 negative and tube 9 will be cut off due to this greater negative potential applied to its grid. The threshold point to which the signal and noise represented at 47 must rise in the negative direction to cut off the tube 9 may be at the level 48 of Fig. 3*a*.

When tube 9 ceases conduction the control grid of tube 15 is caused to go more positive, since it is connected to the anode of tube 9 and the states of conduction of the tubes 15 and 18 will be reversed, leaving tube 15 conductive and tube 18 non-conductive.

The cutting off of current through tube 18 will permit its anode potential to rise in a positive direction thereby causing the cathode of diode 21 to rise in potential. This biases diode 21 beyond cutoff and allows the potential on lead 26 to rise to the value which is maintained at point 58. Since this rising potential is applied to the control grids of tubes 31 and 32 the same become operative to amplify tone applied at 28 and supplied to the outputs at 34. The amplified tone, which may be as represented in line 3*f*, is turned on and off according to Fig. 3*b*, which represents the potential variations on lead 26 as governed by mark and space conditions.

The hold-back effect which prevents turning off of the tone keyer now turned on will now be explained in detail. It is not desirable to have the output tone broken up or turned off by negative noise peaks such as at 53 in Fig. 3*a*, and so my improved circuit holds back from triggering until a lower threshold level 49 is reached. To do this I provide improved means for preventing the triggering circuit from tripping back to the no-signal condition at which 18 is conductive and 15 non-conductive until a selected threshold level such as at 49, Fig. 3, is reached. This is accomplished by the action or function of resistors 6 and 11. Under the no-signal condition, that is, at 46, Fig. 3*a*, a certain amount of positive bias is applied to the grid of tube 9 by resistor 11 from the anode of tube 15 which under no-signal condition is cut off. When the signal arrives and the grid of 9 is biased negative to cut tube 9 off and start conduction in tube 15, the potential at the anode of tube 15 drops and this drop in potential is applied to the grid of tube 9 to drive the same in a negative direction even further below cutoff than the marking signal causes it to go. This additional bias or greater than cutoff bias persists during the signal-on condition (at 47 in Fig. 3*a*) and, hence, sets a lower threshold value as illustrated by level 49 of Fig. 3*a* to which the signal level must fall before tripping action takes place, that is, before tube 9 is permitted to again conduct to cut off tube 15 and turn on tube 18. The signal plus noise drops below level 49 to trip the locking circuit of triodes 15 and 18 back to the off or no-signal status. This point at which thresholding action may take place is illustrated at point 51 of the varying voltage shown in Fig. 3*a*.

The potentiometer 7 provides a means for adjusting the potential at which the cathode of tube 9 operates and thereby for setting the threshold level 48, Fig. 3*a*, at which the trigger circuit is in the signal-on condition with tube 18 non-conductive. The variable resistor 6 controls the hold-back effect or magnitude of change or dropping off in signal voltage from level 48 towards level 49 which must occur before the tubes 15 and 18 are triggered to the signal-off condition with tube 15 non-conductive and tube 18 conductive.

The diode rectifier 21 operates to clip or limit off any irregularities that may come from the anode of tube 18 during the signal-on condition when a stable tone output at 34 from the tone keyer is desired. During the signal-off time triode 18 is conducting and its anode potential is down to a relatively low value. This allows the cathode of tube 21 to assume a relatively low positive potential such that there is a flow of current from the point 58 down through resistor 25 through the impedance of diode 21 and resistor 20 to ground. This causes the potential at the anode of diode 21 and on lead 26 and the grids of tubes 31 and 32 connected therewith to be at a value sufficiently negative with respect to the potential on the cathodes of tubes 31 and 32 to cause these tubes to be completely cut off. This prevents the tone applied at terminals 28 from being passed on through amplifier tubes 31 and 32 to terminals 34.

A rise in the anode potential of triode 18 occurring when mark signal triggers the the circuit on, raises the cathode potential of diode 21 above the cutoff value. That is, it raises this cathode to a potential higher than the potential existing at the anode of diode 21 and at point 58. The potential at point 58 is then supplied directly over lead 26 to the grids of triodes 31 and 32, there being no voltage drop in resistor 25. Tubes 31 and 32 are then turned on to supply tone output. Any further variation in the potential of the anode of tube 18, except when the signal goes off, cannot be passed on to the triodes 31 and 32, and a constant level of keyed tone output is assured during the mark interval.

Figure 2:
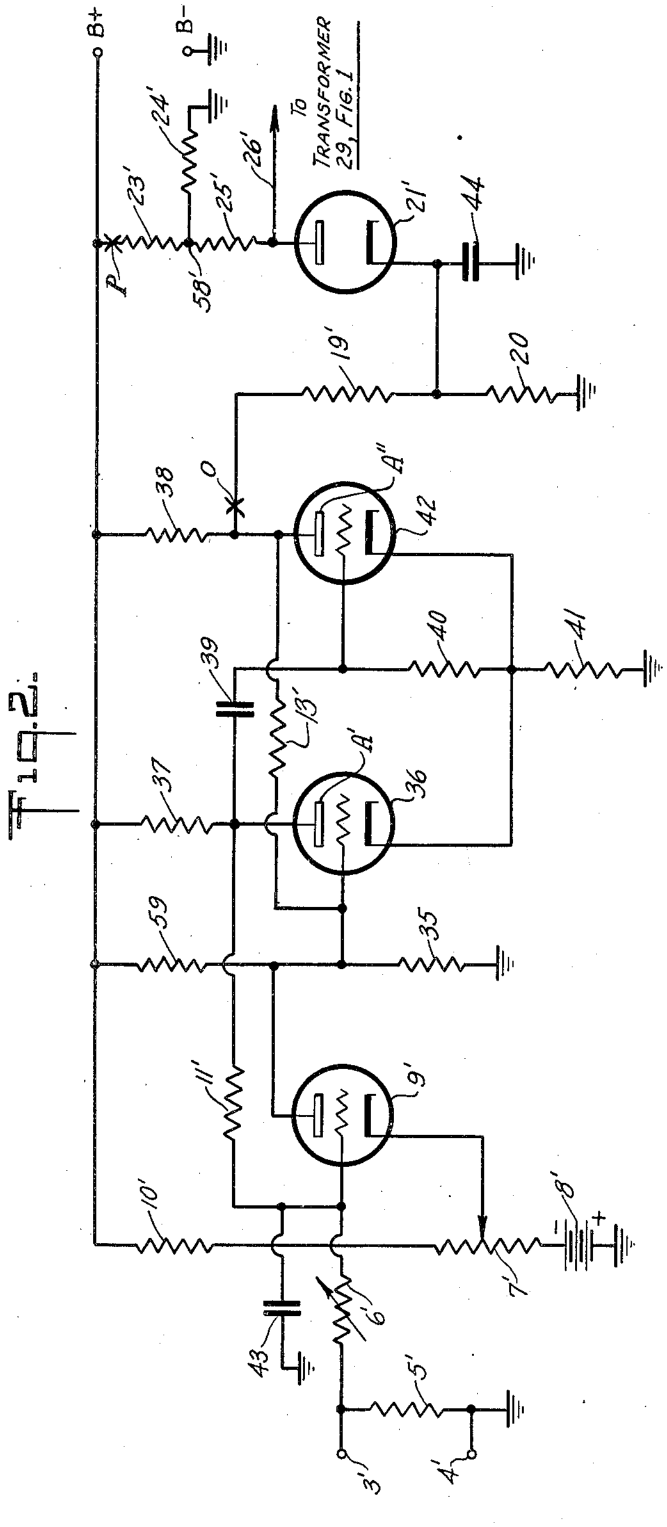

In the embodiment of Fig. 2, a flip-flop type of triggering circuit is used in place of the Eccles-Jordan locking circuit of Fig. 1. The arrangement of Fig. 2 is in many respects similar to the arrangement of Fig. 1, and in Fig. 2 numerals corresponding to those used in Fig. 1 are used in so far as possible, with the numerals being used with primes in Fig. 2.

The triggering circuit of the embodiment of Fig. 2 comprises tubes 36 and 42, having anodes A′ and A″ connected by resistors 37 and 38 to the positive terminal of a source of direct current potential the negative terminal of which is grounded. The control grid of tube 42 is connected to ground by resistors 40 and 41, the resistor 41 being a cathode resistor common to the cathode return circuits of tubes 36 and 42. The tube 36 has its control grid grounded by a resistor 35 and its control grid directly coupled to the anode of the tube 9′. The anode of tube 9′ is connected to the direct current source by resistor 59. The anode of tube 36 is coupled to the control grid of the tube 42 by a condenser 39 the size of which controls in part at least the frequency at which the tubes 36 and 42 oscillate or operate in the flip-flop circuit. The anode of tube 42 may be coupled to the grid of tube 36 by a resistance 13′. Condensers 43 and 44 are bypass condensers. The arrangement of Fig. 2 is otherwise substantially similar to the arrangement of Fig. 1.

The operation of the embodiment of Fig. 2 is likewise quite like the operation of the embodiment of Fig. 1 in many respects. The tube 9 is again conducting in the absence of signals as described hereinbefore, so that tube 36 is then non-conductive and tube 42 is then conductive. Once the tubes 36 and 42 are triggered, by the signal-on status, so that momentarily tube 36 becomes conductive and tube 42 non-conductive, they oscillate continuously during the signal-on condition, in a manner similar to a multivibrator. The period at which they oscillate is determined by charge and discharge rates of condenser 39 through resistors 37 and 40. When the signal mark is on and reaches a magnitude at say point 50 of Fig. 3*a*, triode 9′ is cut off. Its anode potential rises as does the potential on the control grid of tube 36 which becomes conductive. However, triode 36 stays conductive only a short interval of time, while the discharge of condenser 39 through resistor 40 holds the grid of triode 42 negative to cutoff. As soon as condenser 39 is discharged the potential on the grid of tube 42 rises and the tube 42 becomes conductive and almost immediately thereafter tube 36 becomes conductive again since its grid is still held at a high positive value by the signal marking shown at 47 in Fig. 3*a*. The refiring of tube 42 cuts tube 36 off momentarily by virtue of the current from tube 42 going through common cathode resistor 41, thereby causing the potential on the cathode of tube 36 to rise. Tube 36 cannot fire or conduct again until condenser 39 is sufficiently charged through resistor 37. This latter charging action holds the anode of tube 36 at too low a value to start conducting immediately. The tube 36 conducts a short time while condenser 39 discharges and the cycle is repeated as long as the tube 36 is turned on by the signal. A resistance 13′ between the anode of tube 42 and grid of tube 36 may also be used. Then when the tube 42 is turned off the potential on the grid of the tube 36 surges up to turn this tube on and the flip-flop action takes place as described above until signal-off condition makes tube 9′ conductive.

The flip-flop circuit including tubes 36 and 42 continues to oscillate in the manner described above as long as the signal persists above the level 49 (point 51) of Fig. 3*a*. Figs. 3*c* and 3*d* illustrate this performance, Fig. 3*c* showing the anode potential variation of tube 36 and Fig. 3*d* the variation of anode potential of the tube 42. It is preferable for condenser 39 and resistor 40 to have such values that during the signal-on condition when oscillations are occurring, tube 36 be in the conductive state a much larger proportion of the time than tube 42. This gives a greater average value of hold-back voltage supplied from the anode of triode 36 to the grid of triode 9′. This hold-back voltage is for the purpose described above in connection with Fig. 1 to hold off the triggering action until the signal magnitude falls to say below point 51 of Fig. 3*a* to thereby prevent noise components riding on the signal from operating the triggering circuit. By so proportioning condenser 39 and resistor 40 that tube 36 is in the conducting state a much larger proportion of the time than tube 42, the hold-back voltage supplied from the anode of tube 36 to the grid of tube 9′ is of a greater average value. This hold-back voltage is filtered by means of condenser 43. These unequal conduction periods of triodes 36 and 42 also supply a higher average value of potential, filtered by condenser 44, to the cathode of diode 21′. Making the value of capacitor 39 smaller with respect to the value of resistor 40 shortens the time required for the condenser to discharge, thereby making tube 42 conductive for a smaller portion of the oscillating period of tubes 36 and 42.

The embodiment of Fig. 2 otherwise operates substantially as described above in Fig. 1.

Figure 4:
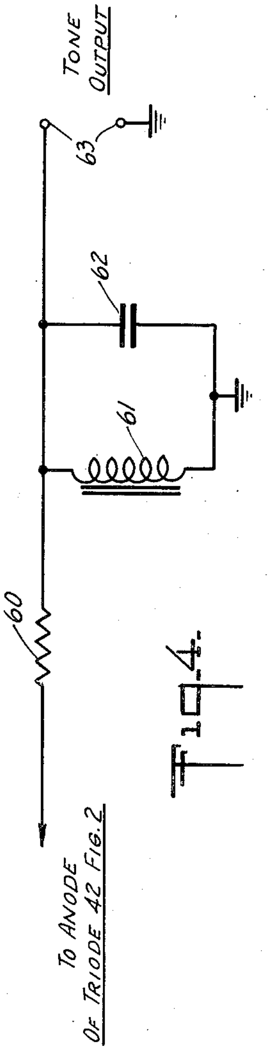

In the embodiment of Fig. 4, the output of the tube 42 is converted directly into tone by means of the circuit shown. Condenser 62 and inductance 61 comprise a parallel resonant circuit tuned to the same frequency as that at which the flip-flop tubes 36 and 42 oscillate. An isolating and feed resistor 60 allows the rectangular output wave of triode 42 to be converted into sine wave form by the resonant circuit 61—62. The circuit of Fig. 2 may then be broken at the points O and P and tube 21′, elements 19′, 20, 23′, 24′, 25′, 26′ and 58′ and capacitor 44 replaced by the resonant circuit of Fig. 4. Fig. 3*e* illustrates the wave form of the output of the circuit of Fig. 4. The circuit constants of the system may be adjusted to give any desired tone frequency. Then the keyed tone output would be supplied over lines to a remote point for operating printing or other recording equipment.

What is claimed is:

1. In a signalling system, a pair of electron discharge devices having electrodes cross coupled and connected to potential supply sources in such a manner that when one device is nonconductive the other device is conductive and vice versa, a control tube having its anode coupled to the control grid of said one device and having its control grid biased by such a potential that when the said control tube is conductive said one device is nonconductive and vice versa, a source of control potential which varies between two values in accordance with signals and also varies about said two values in an undesired manner, connections from said source to said control grid of the control tube for impressing said control potential thereon to change the conductivity of said control tube, when said control potential reaches one of said two values, a holding circuit connecting one electrode of one device to the control grid of said control tube and responsive to current flow in said last named one of said two devices to apply additional potential to the control grid of said control tube to retain the same in the state of conductivity to which it has been tripped for a time after said control potential applied to said grid recedes from said value at which the tube's conductivity changed, and an output circuit coupled to one of the devices.

2. A signalling system as recited in claim 1, wherein the coupling between said one device and said output circuit includes a potential limiter.

3. In signalling apparatus, a pair of electron discharge devices having electrodes including anodes, cathodes and control grids cross coupled and connected to potential supply sources in such a manner that when one device becomes non-conductive the other device becomes conductive and vice versa, a control tube having an anode, a cathode and a control grid, means coupling the anode of the control tube to the control grid of said one device, a circuit for biasing the control tube control grid relative to its cathode by a potential such that the tube is conductive, the arrangement being such that said one device is then non-conductive, connections for applying a variable control potential to the control grid of the control tube which rises to a value such as to make the same non-conductive to thereby make said one device conductive, means responsive to current flow in said one device for applying additional potential to the control grid of said control tube to maintain the same non-conductive for limited variations of said control potential with respect to said value at which the tube became non-conductive, and an adjustable resistor connected to the cathode of the control tube for adjusting the potential at which the cathode of said control tube operates to adjust the level at which the control potential applied to the control tube grid becomes effective to make the same non-conductive.

4. In signalling apparatus, a pair of electron discharge devices having electrodes including anodes, cathodes and control grids cross coupled and connected to potential supply sources in such a manner that when one device becomes non-conductive the other device becomes conductive and vice versa, a control tube having an anode, a cathode and a control grid, means coupling the anode of the control tube to the control grid of said one device, a biasing circuit for biasing the control tube control grid relative to its cathode by a potential such that the tube is conductive, the arrangement being such that said one device is then non-conductive, connections for applying a variable control potential to the control grid of the control tube which rises to a value such as to make the same non-conductive to thereby make said one device conductive, means responsive to current flow in said one device for applying additional potential to the control grid of said control tube to maintain the same non-conductive irrespective of variations other than signal variations of said control potential below said value at which the tube became non-conductive, and adjustable resistive means in the grid circuit of said control tube for adjusting the effectiveness of the additional potential applied to the control tube grid to thereby adjust the level to which the control potential applied to the control tube grid must fall to make the control tube conductive.

5. In signalling apparatus, a pair of electron discharge devices having electrodes including anodes, cathodes and control grids cross coupled and connected to potential supply sources in such a manner that when one device becomes non-conductive the other device becomes conductive and vice versa, a control tube having an anode, a cathode and a control grid, means coupling the anode of the control tube to the control grid of said one device, means for biasing the control tube control grid relative to its cathode by a potential such that the tube is conductive, the arrangement being such that said one device is then non-conductive, means for applying a variable control potential to the control grid of the control tube which rises to a value such as to make the same non-conductive to thereby make said one device conductive, means responsive to current flow in said one device for applying additional potential to the control grid of said control tube to maintain the same non-conductive for a time after said control potential applied to said control grid falls below said value at which the tube became non-conductive, adjustable resistive means for adjusting the potential at which the cathode of said control tube operates to adjust the level at which the control potential applied to the control tube grid becomes effective to make the same non-conductive, and adjustable resistive means in the grid circuit of the control tube for adjusting the effectiveness of the additional potential applied to the control tube grid to thereby adjust the level to which the control potential applied to the control tube grid must fall to make the control tube conductive.

6. In signalling apparatus in combination, a pair of electron discharge devices having anodes, cathodes and control grids cross coupled by resistance and capacity and connected to potential supply sources in such a manner that when one device is non-conductive the other device is conductive and vice versa, the rate of reversal in the conditions of said devices depending in part at least on the amount of resistance and capacity in the circuits, an electron control device having a control electrode, and having an output electrode coupled to the control grid of one device in such a manner that the said control device and said one device are alternatively conductive, a source of potential which varies in accordance with signals between two values, means for applying said potential to the control electrode of said control tube to control the state of conductivity thereof, resistive means coupling the anode of said one device to the control electrode of said control device, and a parallel circuit tuned to the frequency of operation of said discharge devices connected with the anode of one of said discharge devices.

7. In signalling apparatus, a pair of electron discharge devices each having an anode, a cathode, and a control grid with the electrodes interconnected and supplied by operating potentials in such a manner that when one device is non-conductive the other is conductive and vice versa, a resistor in the supply circuit of said one device, a control tube having its anode coupled to the control grid of said one device and having its control grid normally biased to such a potential that the control tube is conductive, said one device and said control tube being alternatively conductive, a source of potential which varies from about zero potential to a negative value in accordance with signals and also varies about said negative value in accordance with noise or similar disturbances, means for applying said potential to the control grid of the control tube to bias the same to cutoff to trip the state of conductivity of the two devices, and a resistor coupling the anode of said one device to the control grid of said control tube to apply thereto the potential on the anode of said one device to supplement the bias on the control grid of said control tube to prevent subsequent variations in said control potential in accordance with noise or similar disturbances from retripping the state of conductivity of said two devices.

8. In signalling apparatus, a pair of electron discharge devices, each having an anode, a cathode, and a control grid, with the anodes and control grids cross-coupled and with the grids and anodes coupled to potential supply sources such that when one device is non-conductive the other device is conductive and vice versa, a resistor in the coupling between each anode and its supply source, a control tube having its anode coupled to the control grid of said one device and having its control grid in a biasing circuit such that when the control tube is conductive one of said devices is non-conductive and vice versa, a source of control potential which varies between two values in accordance with signals and also varies in an undesired manner, connections from said source to said control grid of the control tube for impressing said control potential thereon to change the state of conductivity of the control tube, when said control potential reaches one of said two values, a connection from the anode of said one device to the control grid of the control tube for applying additional potential to the control grid of said control tube to retain the same in the state of conductivity to which it has been tripped irrespective of variations, other than signal variations, of said control potential applied to said grid with respect to said value at which the tube's conductivity is changed, and an output circuit coupled to one of said devices.

9. In signalling apparatus, in combination, a locking circuit including electronic means with electrodes including an output electrode and an input electrode with the electrodes interconnected and supplied by operating potentials in such a manner that the locking circuit has two conditions of stability, a control tube having a control grid and having an anode coupled to said input electrode and having its control grid in a biasing circuit such that when the control tube is conductive the locking circuit is in one condition of stability and when the control tube is non-conductive the locking circuit is in the other condition of stability, a source of potential which varies in accordance with signals and also varies to a less extent in accordance with noise or similar disturbances, a connection between said source and said control grid of said control tube to control the state of stability of said locking circuit, and a coupling between said output electrode and an electrode of said control tube to apply thereto a potential which supplements the action of said control potential on the control grid of said control tube to prevent variations in said control potential in accordance with noise or similar disturbances from taking over control of the condition of stability of said locking circuit.

10. In signalling apparatus, in combination, a locking circuit including electronic means with electrodes including an output electrode and an input electrode with the electrodes interconnected and supplied by operating potentials in such a manner that the locking circuit has two conditions of stability, a control tube having a control grid and having an anode coupled to said input electrode and having its control grid normally biased to such a potential that the control tube is conductive, a source of potential which varies from about zero potential to a negative value in accordance with signals and also varies about said negative value in accordance with noise or similar disturbanes, means for applying said potential to the control grid of the control tube to bias the same to cut-off to trip the condition of stability of said locking circuit, and resistive means coupling said output electrode to the control grid of said control tube to apply thereto a potential which supplements the bias on the control grid of said control tube to prevent subsequent variations in said control potential in accordance with noise or similar disturbances from retripping the condition of stability of said locking circuit.

11. In signalling apparatus, a pair of electron control devices having electrodes cross coupled and connected to potential supply sources in such a manner that when one device is non-conductive the other device is conductive and vice versa, an electrode structure having its output electrode coupled to the control electrode of said one device and having its control electrode biased by such a potential that when the electrode structure is conductive said one device is non-conductive and vice versa, means for applying a control potential to the control electrode of the electrode structure of a value such as to make the same non-conductive, a connection between an electrode of said one device and the control electrode of the electrode structure whereby when current flows in said one device a holding potential is applied to the control electrode of said electrode structure to maintain the same non-conductive for limited variations of said control potential with respect to said value at which the electrode structure became non-conductive, and an output circuit coupled to one of said devices.

WARREN HERBERT BLISS.

REFERENCES CITED

The following references are of record in the file of this patent:

UNITED STATES PATENTS

| Number | Name | Date |
|---|---|---|
| 2,061,734 | Kell | Nov. 24, 1936 |
| 2,185,199 | Kahn | Jan. 2, 1940 |
| 2,266,668 | Tubbs | Dec. 16, 1941 |
| 2,324,314 | Michel | July 13, 1943 |
| 2,383,126 | Hollingsworth | Aug. 21, 1945 |
| 2,426,454 | Johnson | Aug. 26, 1947 |